United States Patent
See et al.

(10) Patent No.: US 12,288,006 B2
(45) Date of Patent: Apr. 29, 2025

(54) APPARATUS, SYSTEM, AND METHOD FOR MANAGING AUDIO ACCESSORIES

(71) Applicant: MOTOROLA SOLUTIONS, INC., Chicago, IL (US)

(72) Inventors: Joo Yih See, Alor Setar (MY); Yusasmadi Yusof, Butterworth (MY); Woei Chyuan Tan, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 437 days.

(21) Appl. No.: 17/818,734

(22) Filed: Aug. 10, 2022

(65) Prior Publication Data

US 2024/0053947 A1    Feb. 15, 2024

(51) Int. Cl.
*G06F 3/16*       (2006.01)
*H04B 1/3827*  (2015.01)

(52) U.S. Cl.
CPC ............... *G06F 3/16* (2013.01); *H04B 1/385* (2013.01); *H04B 2001/3866* (2013.01)

(58) Field of Classification Search
CPC .. G06F 3/16; H04R 1/028; H04R 3/12; H04R 1/1041; A62B 18/08
See application file for complete search history.

(56) References Cited

U.S. PATENT DOCUMENTS

| | | | | |
|---|---|---|---|---|
| 9,998,577 B1* | 6/2018 | Harmke | ............... | H04W 4/10 |
| 2015/0289044 A1 | 10/2015 | Seven | | |
| 2015/0319298 A1* | 11/2015 | Corretjer | ............... | H04W 4/90 |
| | | | | 455/404.1 |
| 2016/0066084 A1* | 3/2016 | Chua | ............... | G08B 3/00 |
| | | | | 381/123 |
| 2017/0142517 A1 | 5/2017 | Borkhovik et al. | | |
| 2018/0145745 A1* | 5/2018 | Sachs | ............... | G06F 13/36 |

OTHER PUBLICATIONS

The International Search Report and the Written Opinion, corresponding patent application No. PCT/US2023/027775 filed: Jul. 14, 2023, mailed Oct. 27, 2023, all pages.

* cited by examiner

*Primary Examiner* — Patrick C Chen
(74) *Attorney, Agent, or Firm* — Barbara R. Doutre

(57) ABSTRACT

A portable communication system includes a remote speaker microphone (RSM) accessory (102) coupled to a portable radio and further coupled to a secondary audio accessory (SAA) (108). The RSM accessory (102) includes a user interface toggle switch (120) that toggles between a first mode of operation and a second mode of operation. Toggling to the first mode of operation selectively routes receive audio from the portable radio to a speaker (112) of the RSM accessory, while generating and routing a periodic audio artifact from the RSM to the SAA (108) for play out at a speaker (316) of the secondary accessory. The received audio is played out of the RSM speaker (112) in parallel with the periodic audio artifact being played out of the secondary accessory speaker (316).

10 Claims, 4 Drawing Sheets

APPARATUS, SYSTEM, AND METHOD FOR MANAGING AUDIO ACCESSORIES

FIELD OF THE INVENTION

This application pertains to audio accessories for a portable communication device and more particularly to managing audio of a plurality of audio accessories.

BACKGROUND OF THE INVENTION

Portable communication devices, such as portable public safety radios, are often used in conjunction with audio accessories. Some audio accessories are preferred for use in high noise environments, while others are preferred for use in quieter environments. There are user applications, such as fire rescue, airports, oil rigs, and the like, in which both types of accessories may be worn by a single user. Audio accessories used in high noise environments tend to be heavy duty type devices worn on, or about, the user's head, while devices used in quiet environments may be located elsewhere on the body. The management of a plurality of accessories may be challenging for a user moving from a high noise environment to a quieter environment and then back to the high noise environment. If a user has changed to an accessory suitable for a quiet environment then moves back to a high noise environment without switching devices, then audio may be missed.

Accordingly, there is a desire for improved audio management of a plurality of audio accessories.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
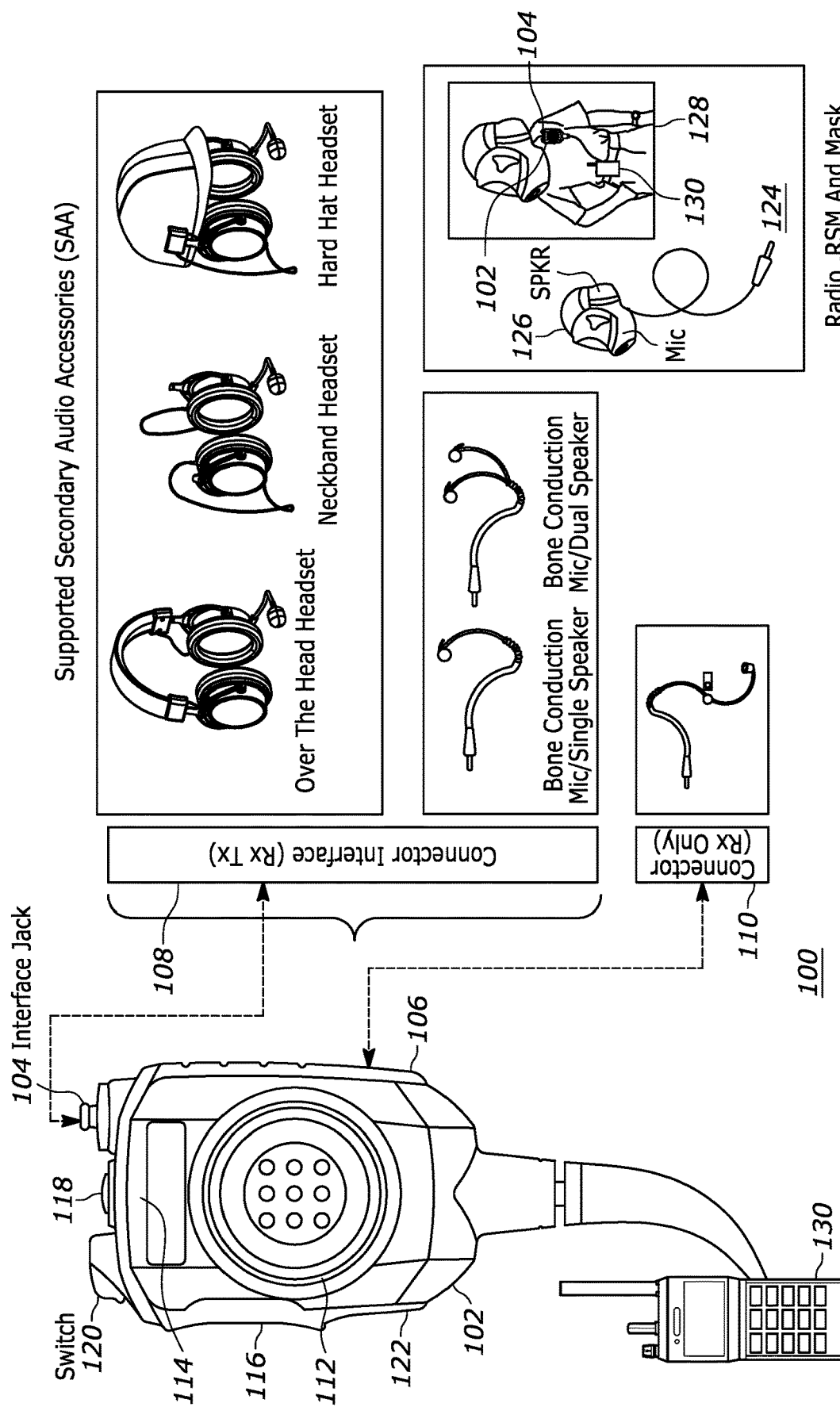
FIG. 1 is a portable communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, the embodiments provided herein facilitate the management of portable accessories being transitioned between a high noise environment and a quiet environment, where some accessories are more suited to the high noise environment, while others are more suited to the quiet environment. A user interface switch is provided to toggle between a remote speaker microphone (RSM) accessory, for quiet environments, and a secondary audio accessory, for noisy environments. However, it is still possible that the user may forget to toggle back to the secondary audio accessory when transitioning back to a noisy environment. The embodiments provided herein provide for an RSM accessory that operates as part of a portable communication system, that addresses the challenge missed audio through the addition of a periodic audible artifact which serves as an alert to switch accessories.

For example, a firefighter may wear a self-contained breathing apparatus (SCBA) with integrated microphone and speaker (or bone conduction earpiece) in a high noise environment and then remove the SCBA device when moving to a quieter environment, such as when taking a break. Once the SCBA device is removed, the firefighter may switch to another accessory more suitable to the quiet environment, such as a remote speaker microphone (RSM) accessory. The embodiments provide for an audible alert to notify the user to switch back to SCBA operation under the high noise environment, thereby avoiding any missed audio. As another example, the user of a heavy duty headset, such as used in oil rig applications or airport applications, may wish to remove the headset when moving to a quieter environment, where an RSM accessory may be more suitable. When the user returns to the high noise environment, an audible alert is played out at the headset as an indication to switch back to headset operation, thereby avoiding missed audio.

The embodiments provide for a portable communication system, including a remote speaker microphone (RSM) accessory having a user interface toggle switch that toggles between a RSM mode of operation and a secondary accessory mode of operation. The toggling to the RSM mode of operation selectively routes receive audio to a speaker of the RSM accessory while generating and routing a periodic audio artifact to a secondary accessory for play out at a speaker of the secondary accessory. Toggling to the second accessory mode of operation switches off the periodic audio artifact and routes the received audio to the secondary accessory for play out at a speaker of the secondary accessory.

Viewed from an RSM accessory embodiment, the RSM accessory includes an RSM speaker; a user interface toggle switch for toggling between a RSM mode and a secondary accessory mode; a radio speaker line, the radio speaker line being selectively coupled to one of the RSM speaker or a secondary accessory speaker line for playout of radio audio in response to the toggle switch; a timer; and a DC voltage bus path operatively switched by the timer to apply a periodic audio artifact to the secondary accessory speaker line in response to the toggle switch being toggled from secondary accessory mode to the RSM mode.

The embodiments further provide for a method of managing audio in a portable communication system, by toggling a user interface switch, of a remote speaker microphone (RSM) accessory, from a secondary accessory mode to a RSM mode; coupling a radio speaker line of the RSM accessory to an RSM speaker line of the RSM accessory in response to the toggle; and a secondary accessory speaker line of the secondary accessory; generating a periodic audio artifact in response to the toggle; routing the periodic audio artifact to a secondary accessory speaker line of the secondary accessory; routing receive radio audio to a speaker of the RSM accessory while operating in the RSM mode; and playing out the receive radio audio at the speaker of the RSM accessory in parallel with playing out the periodic audio artifact at a speaker of the secondary audio accessory.

The embodiments further provide for an overall portable communication system that includes a portable two-way radio; a remote speaker microphone (RSM) accessory coupled to the portable two-way radio; a secondary audio accessory coupled to the RSM accessory; a user interface toggle switch coupled to the RSM accessory for toggling between an RSM audio mode of the RSM accessory and a second accessory audio mode of the secondary audio accessory. The RSM accessory includes circuitry for generating a periodic audio artifact for playout at a speaker of the secondary audio accessory in response to the user interface toggle switch toggling from the secondary audio mode to the RSM audio mode.

FIG. 1 is a portable communication system 100 formed and operating in accordance with some embodiments. The portable communication system 100 includes a remote speaker microphone (RSM) accessory 102 and a plurality of secondary audio accessories (SAAs) 108, 110 which may be interchangeably coupled to the RSM accessory 102 via one of two different audio accessory interfaces, referred to as first and second audio interfaces 104, 106. The first audio interface 104 interchangeably couples to accessories that are both receive/transmit (Rx/Tx) type accessories having a microphone and at least one speaker located at an earpiece. The second audio interface 106 interchangeably couples to accessories that are receive-only type audio accessories having at least one speaker located at an earpiece.

Each of the plurality of secondary audio accessories (SAAs) 108 or 110 may mate to appropriate RSM audio interface 104 or 106 through audio connector interfaces, such as a plug and jack connector interfaces or other suitable audio interface. The first audio interface 104 preferably comprises a ruggedized type interconnect, suitable for audio accessories used under high noise conditions. Secondary audio accessories 108 which couple to first audio interface 104 may include, but are not limited to, over-the-head speaker headset with microphone, twin cup speaker headset with microphone, neckband speaker headset with microphone, helmet/hardhat with integrated speaker headset, and breathing apparatus communication devices having microphone with single or dual speaker integrated therein or coupled thereto. Secondary audio accessories 110 which couple to second audio interface 106 are receive-only devices that include at least one speaker located at an earpiece. The receive only accessory 110 is intended for quieter environments. Jack/plug interfaces, for example NEXUS plug/jack interfaces, manufactured by Amphenol Corporation, provide an example of couplings well suited to ruggedized environments. The SAA pin-out for first audio interface 104 includes microphone line-up, speaker line-up, detection and ground. The SAA pin-out for second audio interface 106 includes speaker line-up, detection and ground.

Noisy environments may be encountered under a variety of conditions, such as fire rescue, airports, oil rigs, and construction sites, to name a few. For example, in some environments a firefighter may be using a SCBA mask with communication devices embedded inside the mask In other environments, a firefighter may be using a SCBA passive mask with hone conductive earpieces. Officers may wear heavy duty headsets at airports or other high noise environments. The ability of the user to switch from their secondary audio accessory (SAA) 108 to their RSM accessory 102 allows the user to remove the heavy duty SAA when moving to a quieter location. When the user moves back to the noisy environment, the embodiments provided herein facilitate the user's ability to switch back to the SAA device and maintain audio communication.

The RSM accessory 102 includes a speaker 112 (also referred to as RSM speaker), a microphone 114, and at least one push-to-talk (PTT) button 116, and may further include an emergency button 118 and a programming button 122. The RSM accessory 102 may further include a second PTT button on the front of the RSM, allowing a user to use push-to-talk from either the side or front of the device. In accordance with the embodiments, the RSM accessory 102 further includes a user interface button that controls a toggle switch 120 for toggling between a RSM mode and a secondary accessory mode.

View 124 shows the secondary audio accessory 108 having its speaker located beneath or integrated within a self-contained breathing apparatus (SCBA) mask 126. View 128 shows a user-wearer of the SCBA mask 126, wherein the secondary audio accessory 108 is integrated as part of the SCBA mask, while the RSM accessory 102 remains external to the SCBA mask. For example, the RSM accessory 102 may be worn at the shoulder or in front of the user. The RSM accessory 102 is coupled to a portable radio 130, typically worn at the waist or chest of the user.

Views 124 and 128 show the secondary audio accessory (microphone and speaker) being integrated with the SCBA mask 126. In this usage application, the speaker of the secondary accessory is isolated from the speaker 112 of the RSM accessory 102. As mentioned previously, in certain public safety applications such as fire rescue where an SCBA is used by a firefighter, the speaker of the secondary audio accessory 108 is to be prioritized over the speaker of the RSM accessory 102. The portable communication system 100 provides for this prioritization via the user interface toggle switch 120 and notification alert.

In accordance with some embodiments, the remote speaker microphone (RSM) accessory 102 includes the user interface toggle switch 120 that toggles between a first mode of operation and a second mode of operation, wherein: toggling to the first mode of operation selectively routes receive audio to a speaker of the RSM accessory, while generating and routing a periodic audio artifact to a secondary accessory for play out at a speaker of the secondary accessory, and toggling to the second mode of operation disables the periodic audio artifact and routes the radio audio to the secondary accessory for play out at a speaker of the secondary accessory.

As part of the portable communication system 100, the remote speaker microphone (RSM) accessory 102 is coupled to the portable radio 130 and the secondary audio accessory 108 is coupled to the RSM accessory. The portable radio 130 is a two-way portable radio providing half-duplex audio communication which can be remoted to the RSM accessory 102, and under various operating conditions can be remoted through the RSM accessory to the secondary audio accessory 108 or 110. The user interface toggle switch 120 is coupled to the RSM accessory for toggling between the RSM audio mode and the second accessory audio mode. The RSM accessory 102 includes circuitry, to be described in conjunction with FIG. 3, for generating a periodic audio artifact for playout at a speaker of the secondary audio accessory 108 in response to the user interface toggle switch toggling from the secondary audio mode to the RSM audio mode.

Figure 2:
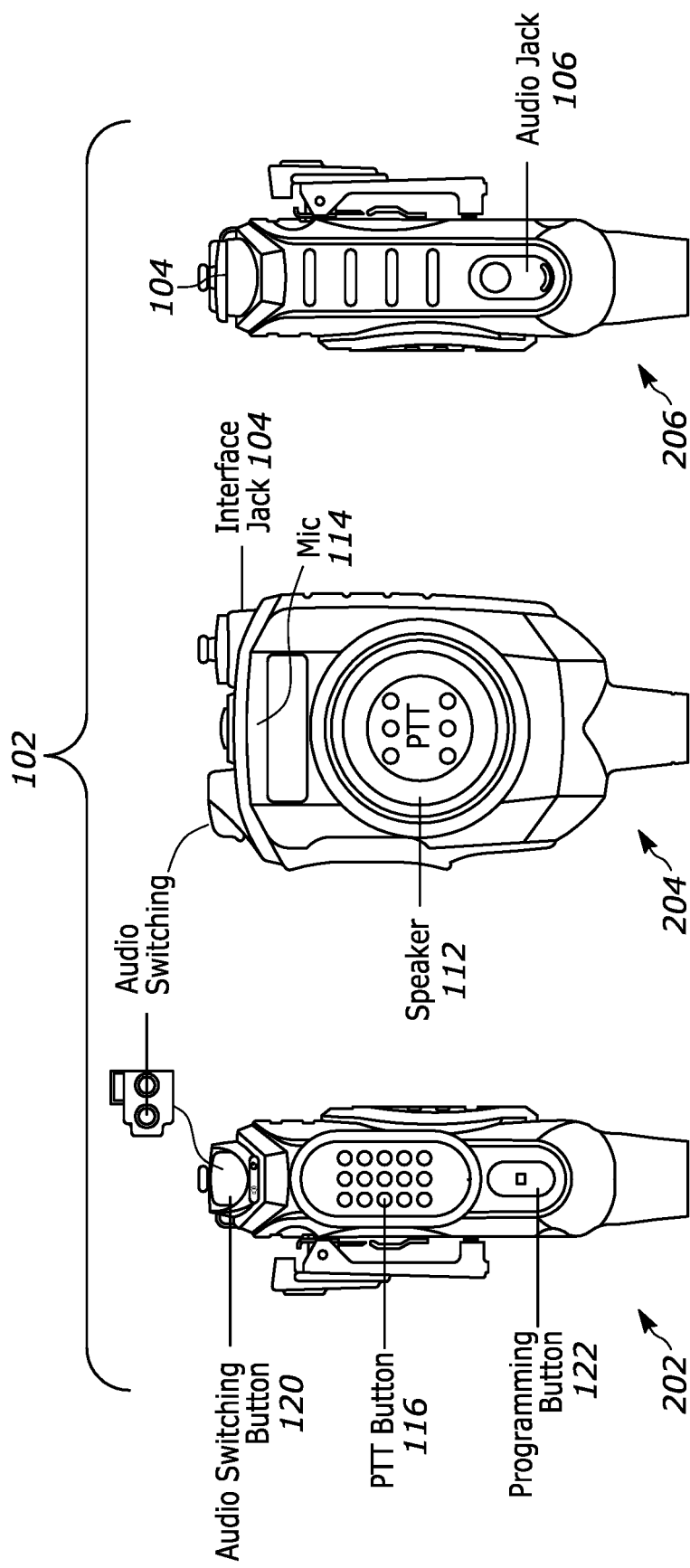
FIG. 2 shows a variety of views of the remote speaker microphone (RSM) accessory of FIG. 1 in accordance with some embodiments.

FIG. 2 shows a variety of views of the remote speaker microphone (RSM) accessory 102 of FIG. 1 in accordance with some embodiments. The views include a first side view 202 showing the user interface toggle switch 120 for switching between the RSM mode and the secondary audio accessory (SAA) mode. The SAA mode is considered a priority mode when a secondary accessory is attached to the RSM accessory 102, thereby ensuring audio routing to the SAA device. The second front view 204 shows RSM speaker 112, the audio switching button 120, and first audio interface, shown as interface jack 104. The interface jack 104 may be covered when no SAA device is plugged into the interface. SAA devices which have a microphone and at least one speaker may interchangeably be coupled to this first audio interface 104. The third side view 206 shows the second audio interface 106, which provides an audio jack for receive-only SAA devices.

The following Table provides examples of RSM and accessory configurations in conjunction the audio routing for both transmit (TX) and receive (RX). The SAA 108 includes both a speaker and a microphone, and the SAA 110 is a speaker-only accessory.

| Configuration | Toggle Setting | Routing TX | Routing RX |
| --- | --- | --- | --- |
| RSM Alone | SAA | RSM | RSM |
| RSM with SAA 108 | | SAA 108 | SAA 108 |
| RSM with SAA 110 | | RSM | SAA 110 |
| RSM Alone | RSM | RSM | RSM |
| RSM with SAA 108 | | RSM | RSM |
| RSM with SAA 110 | | RSM | RSM |

The Table shows that a secondary audio accessory coupled to the RSM accessory 102 has priority for received audio. In other words, the received audio from a portable radio will be routed through the RSM accessory 102 over a secondary accessory audio path for play out at a speaker of the secondary accessory, that secondary audio accessory (108 or 110) being coupled to the RSM accessory. As can be inferred from the above Table, either SAA 108 or SAA 110 is coupled to the RSM accessory 102, but not both. The SAA 110 is a receive-only accessory intended for use under normal noise conditions. Notification alerts are generated through the speaker of SAA 108, as these are the devices which are intended for use under high noise environments.

Figure 3:
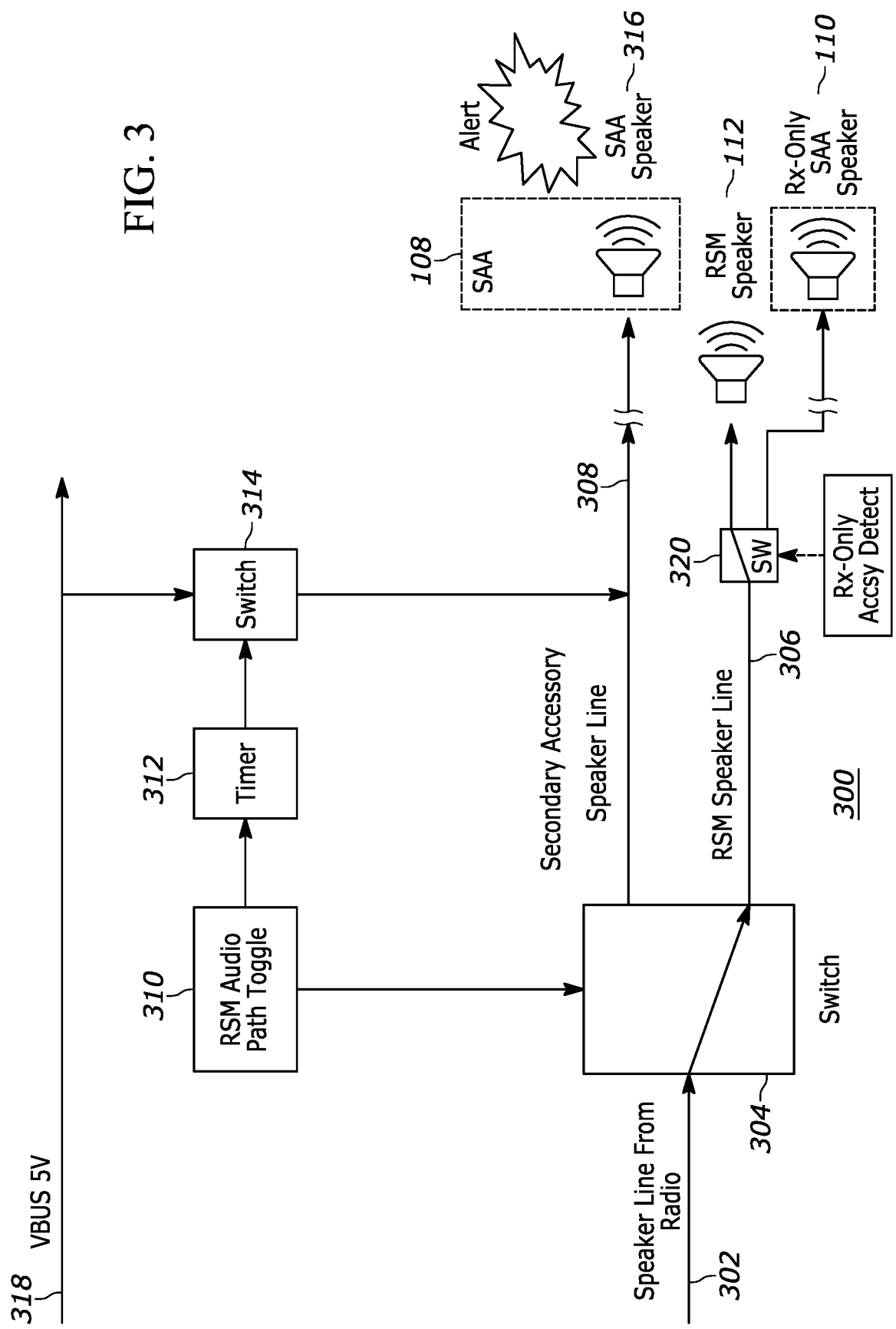
FIG. 3 is a block diagram of audio switching reminder circuitry of the RSM in accordance with some embodiments.

Referring to FIG. 3, there is shown a block diagram of audio switching reminder circuitry in accordance with some embodiments. The RSM accessory 102 includes a user interface toggle 310 (audio switching button 120 of FIG. 1) coupled to a toggle switch 304 for toggling between a RSM mode and a secondary accessory mode. A radio speaker line 302 is selectively coupled to one of the RSM speaker 112 or a secondary accessory speaker line 308 in response to toggle switch 304. Coupling the radio speaker line 302 to the RSM speaker line results in radio audio being played out of the RSM speaker 112, while a periodic audio artifact is generated and coupled to the secondary accessory speaker line 308, for playout of the audio artifact at the SAA speaker 316. To generate the periodic audio artifact, a DC voltage (e.g. 5V) is latched in from a bus path 318 via switch 314 and controlled by a timer 312 to apply a periodic audio artifact to the secondary accessory speaker line 308 in response to the toggle switch 304 being toggled from the secondary accessory mode to the RSM mode. The bus path line 318 stays within the RSM accessory 102 and is routed to other internal RSM circuitries requiring power. The playout of radio audio at the RSM speaker 112 occurs in parallel with the periodic audio artifact being applied to the secondary accessory speaker line 308. The secondary accessory speaker line 308 is coupled to a secondary accessory speaker 316 of the secondary audio accessory (108 in FIG. 1) where the periodic audio artifact is played out. The periodic audio artifact operates as a user alert played out at the speaker 316. The periodic audio artifact, heard through the SAA speaker, alerts the user to switch to secondary accessory mode.

Once the user hears the alert provided by the periodic audio artifact, the user may toggle the user interface toggle 310 to toggle switch 304. In response to toggling the user interface switch from the RSM mode back to the secondary accessory mode, such as when returning to a fire incident scene, the periodic audio artifact applied to the secondary accessory speaker line 308 is switched off 314 by the timer 312, and the radio audio is re-routed from the RSM speaker line 306 to the secondary accessory speaker line 308. The radio audio is then played out of the secondary audio accessory speaker 316.

When a receive-only accessory 110 is detected, such as via a switch 320, and the RSM is operating in SAA mode, then receive audio will be routed to the speaker of the rx-only accessory 110. When a receive-only accessory 110 is detected, and the RSM accessory is operating in RSM mode, then receive audio will be routed to the speaker of the RSM speaker 112. Since the receive-only accessory 110 is intended for use under normal noise environments, there is no need for generation of a periodic audible artifact.

Figure 4:
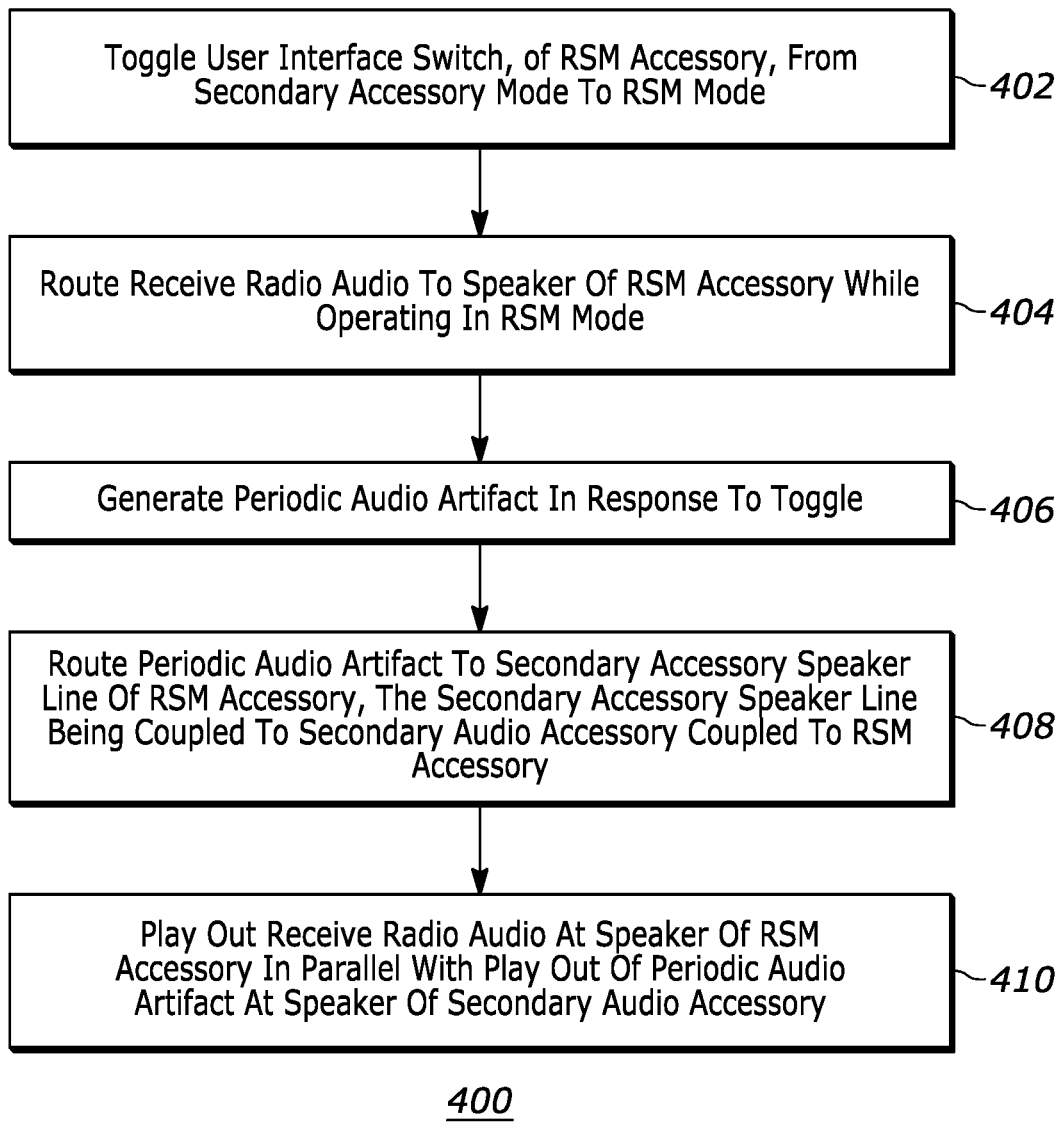
FIG. 4 is a method for generating an audio reminder alert in accordance with some embodiments.

FIG. 4 is a method 400 for generating an audio reminder alarm in accordance with some embodiments. Method 400 begins at 402 by toggling a user interface switch, of a remote speaker microphone (RSM) accessory, from a secondary accessory mode to a RSM mode. This toggling causes the routing of receive radio audio, at 404, to a speaker of the RSM accessory while operating in the RSM mode. In this mode radio audio will only be played out of the RSM accessory. The method further includes, at 406, generating a periodic audio artifact in response to the toggle, and routing, at 408, the periodic audio artifact to a secondary accessory speaker line of the RSM accessory, the secondary accessory speaker line being coupled to a secondary audio accessory coupled to the RSM accessory. The method continues at 410 playing out the received radio audio at the speaker of the RSM accessory in parallel with playing out the periodic audio artifact at a speaker of the secondary audio accessory.

The method may further continue (not shown) by toggling the user interface switch of the RSM accessory from the RSM mode back to the secondary accessory mode, switching off the periodic audio artifact, re-routing the radio audio to the secondary accessory speaker line; and playing out the radio audio at the speaker of the secondary accessory.

The toggling the user interface switch of the RSM accessory from the secondary accessory mode to the RSM mode causes coupling a radio speaker input line of the RSM accessory to an RSM speaker line of the RSM accessory, as was discussed in conjunction with FIG. 3. The toggling the user interface switch of the RSM accessory from the RSM mode back to the secondary accessory mode causes coupling the radio speaker input line of the RSM accessory to the secondary accessory speaker line of the RSM accessory. Again, the secondary accessory speaker line of the RSM accessory is coupled to a secondary audio accessory which is connected to the RSM accessory.

The periodic audio artifact generated at 406 may be generated by switching a DC voltage bus path by a timer, and applying the periodic audio artifact to the secondary accessory speaker line in response to the toggle switch being toggled from secondary accessory mode to the RSM mode.

The various embodiments have provided for improved management of audio accessories without the use of expensive sensors or processor recorded audio tones. The control of the audio routing is managed via a single user interface toggle switch in conjunction with the generation of an audio artifact making the system very easy for a user to operate when working in high noise environments, such as fire rescue and others. The various embodiments make use of what is normally considered an undesirable audio pop, by utilizing an audio artifact generated from an abrupt latch of voltage to the audio path, regulated by a timer to become an audible reminder to the user to change audio paths.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A portable communication system, comprising:
   a remote speaker microphone (RSM) accessory including a user interface toggle switch that toggles between a RSM mode of operation and a secondary accessory mode of operation, wherein:
   toggling to the RSM mode of operation selectively routes receive audio to a speaker of the RSM accessory while generating and routing a periodic audio artifact to a secondary accessory for play out at a speaker of the secondary accessory; and
   toggling to the secondary accessory mode of operation switches off the periodic audio artifact and routes receive audio to the secondary accessory for play out at a speaker of the secondary accessory.

2. The portable communication system of claim 1, wherein the speaker of the secondary accessory is isolated from the speaker of the RSM accessory.

3. The portable communication system of claim 2, wherein the periodic audio artifact played out of the speaker of the secondary accessory operates as a user alert to switch back to secondary accessory mode.

4. The portable communication system of claim 1, wherein the periodic audio artifact is generated via a timer and switch of the RSM accessory.

5. The portable communication system of claim 4, wherein the periodic audio artifact is played out in parallel at the speaker of the secondary accessory while receive audio is played out at the speaker of the RSM.

6. A method of managing audio in a portable communication system, comprising:
- toggling a user interface switch, of a remote speaker microphone (RSM) accessory, from a secondary accessory mode to a RSM mode;
- routing receive radio audio to a speaker of the RSM accessory while operating in the RSM mode;
- generating a periodic audio artifact in response to the toggle;
- routing the periodic audio artifact to a secondary accessory speaker line of the RSM accessory, the secondary accessory speaker line being coupled to a secondary audio accessory (SAA) coupled to the RSM accessory; and
- playing out the received radio audio at the speaker of the RSM accessory in parallel with playing out the periodic audio artifact at a speaker of the secondary audio accessory.

7. The method of claim 6, further comprising:
- toggling the user interface switch of the RSM accessory from the RSM mode back to the secondary accessory mode;
- disabling the periodic audio artifact;
- re-routing the radio audio to the secondary accessory speaker line; and
- playing out the radio audio at the speaker of the secondary accessory.

8. The method of claim 7, wherein:
- toggling the user interface switch of the RSM accessory from the secondary accessory mode to the RSM mode causes coupling a radio speaker line of the RSM accessory to an RSM speaker line of the RSM accessory; and
- toggling the user interface switch of the RSM accessory from the RSM mode back to the secondary accessory mode causes coupling the radio speaker line of the RSM accessory to the secondary accessory speaker line of the RSM accessory.

9. The method of claim 6, wherein the periodic audio artifact is generated by a DC voltage being latched from a bus path via a switch controlled by a timer, and applying the periodic audio artifact to the secondary accessory speaker line in response to the toggle switch being toggled from secondary accessory mode to the RSM mode.

10. The method of claim 6, wherein the secondary accessory is located beneath a self-contained breathing apparatus.

* * * * *